United States Patent
Ichikawa

(10) Patent No.: US 10,272,794 B2
(45) Date of Patent: Apr. 30, 2019

(54) CHARGING CONTROL APPARATUS FOR VEHICLE AND CHARGING CONTROL METHOD FOR THE SAME

(71) Applicant: TOYOTA JIDOSHA KABUSHIKI KAISHA, Toyota-shi, Aichi-ken (JP)

(72) Inventor: Shinji Ichikawa, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 15/846,976

(22) Filed: Dec. 19, 2017

(65) Prior Publication Data

US 2018/0178668 A1 Jun. 28, 2018

(30) Foreign Application Priority Data

Dec. 26, 2016 (JP) ................. 2016-250842

(51) Int. Cl.
*H02J 7/00* (2006.01)
*B60L 9/00* (2019.01)
*B60L 11/00* (2006.01)
*G01R 31/36* (2019.01)
*B60L 11/18* (2006.01)
*B60W 20/12* (2016.01)

(Continued)

(52) U.S. Cl.
CPC ....... *B60L 11/1838* (2013.01); *B60L 11/1862* (2013.01); *B60W 20/12* (2016.01); *B60W 20/14* (2016.01); *B60L 7/10* (2013.01); *B60L 2260/54* (2013.01); *Y02T 10/7005* (2013.01); *Y02T 10/705* (2013.01); *Y02T 10/7044* (2013.01); *Y02T 90/16* (2013.01); *Y02T 90/168* (2013.01); *Y04S 30/12* (2013.01)

(58) Field of Classification Search
CPC .......................... B60L 11/1862; B60L 11/1838
USPC ................. 320/109, 132; 701/22; 702/63
See application file for complete search history.

(56) References Cited

U.S. PATENT DOCUMENTS 6,687,581 B2 * 2/2004 Deguchi ............... B60K 6/442
 701/22
8,473,135 B2 * 6/2013 Sekijima ............ G01C 21/3469
 701/22

(Continued)

FOREIGN PATENT DOCUMENTS

EP 1975561 A2 10/2008
EP 2664478 A1 11/2013

(Continued)

*Primary Examiner* — Richard V Muralidar
(74) *Attorney, Agent, or Firm* — Oliff PLC

(57) ABSTRACT

A charging control apparatus for a vehicle is provided. The vehicle includes a motor generator and an electric power storage device. The charging control apparatus includes: a communication device configured to receive data from a server; and a controller that executes external charging. The controller is configured to execute the external charging in accordance with a target value of State of Charge of the electric power storage device. The controller is configured to lower the target value from a first target value to a second target value in the case where the controller predicts that the State Of Charge exceeds the target value by a specified amount or larger in a section in accordance with record data that is aggregated in the server when the vehicle starts traveling after completion of the external charging.

4 Claims, 7 Drawing Sheets

(51) Int. Cl.
*B60W 20/14* (2016.01)
*B60L 7/10* (2006.01)

(56) References Cited

U.S. PATENT DOCUMENTS

| | | | |
|---|---|---|---|
| 8,798,832 B2* | 8/2014 | Kawahara | H01M 10/441 |
| | | | 701/22 |
| 2010/0131139 A1* | 5/2010 | Sakai | B60K 6/46 |
| | | | 701/22 |
| 2012/0203409 A1 | 8/2012 | Sekijima et al. | |
| 2013/0024055 A1* | 1/2013 | Hysko, Jr. | B60W 50/0097 |
| | | | 701/22 |

FOREIGN PATENT DOCUMENTS

| | | |
|---|---|---|
| EP | 3015333 A1 | 5/2016 |
| EP | 3104121 A1 | 12/2016 |
| JP | 2009-035016 A | 2/2009 |
| JP | 2012-181183 A | 9/2012 |
| JP | 2014-039415 A | 2/2014 |
| WO | 2014/099354 A1 | 6/2014 |

* cited by examiner

CHARGING CONTROL APPARATUS FOR VEHICLE AND CHARGING CONTROL METHOD FOR THE SAME

INCORPORATION BY REFERENCE

The disclosure of Japanese Patent Application No. 2016-250842 filed on Dec. 26, 2016 including the specification, drawings and abstract is incorporated herein by reference in its entirety.

BACKGROUND

1. Technical Field

The present disclosure relates to a charging control apparatus for a vehicle and a charging control method for the same, in which the vehicle is capable of storing electric power in an in-vehicle electric power storage device and the electric power is supplied from an electric power supply on the outside of a vehicle (hereinafter also referred to as "external charging").

2. Description of Related Art

An information communication system that includes an in-vehicle device mounted on a vehicle and a center device is disclosed in Japanese Patent Application Publication No. 2012-181183 (JP 2012-181183 A). The in-vehicle device and the center device are mutually communicable. The center device stores travel history data of a plurality of vehicles. The in-vehicle device receives the travel history data of another vehicle from the center device. The in-vehicle device stores a required electric power amount on a route that a host vehicle has traveled in the past. The in-vehicle device further computes a required electric power amount on a route that the host vehicle has never traveled in the past on the basis of the travel history data of the other vehicle, which is received from the center device.

In JP 2012-181183 A, a required electric power amount from a current location to a destination is computed with a high degree of accuracy by using the stored required electric power amount (the required electric power amount on the route that the host vehicle has traveled in the past) and the computed required electric power amount (the required electric power amount on the route that the host vehicle has never traveled in the past).

SUMMARY

The vehicle includes a motor generator and an electric power storage device. The motor generator performs regenerative power generation during deceleration and the like of the vehicle, and the electric power generated by the regenerative power generation (hereinafter also referred to as "regenerative electric power") is stored in the electric power storage device. In a technique disclosed in JP 2012-181183 A, the required electric power amount from the current location to the destination is taken into consideration when a target value of external charging is decided. However, a transition of State Of Charge (SOC) of the electric power storage device from the current location to the destination is not taken into consideration.

Accordingly, in the case where the external charging is performed at a charging stand on top of a mountain, for example, in accordance with the required electric power amount from the current location to the destination, the electric power storage device is charged until the SOC thereof reaches a value near an upper limit value. In such a case, the regenerative electric power that is generated at a time when the vehicle travels down the mountain may not sufficiently be stored in the electric power storage device, and some of the regenerative electric power is wasted.

The present disclosure provides a charging control apparatus and a charging control method capable of reducing a possibility of wasting regenerative electric power of a vehicle.

A first aspect of the present disclosure is a charging control apparatus for a vehicle. The vehicle includes a motor generator and an electric power storage device. The motor generator is configured to be coupled to drive wheels. The electric power storage device is electrically connected to the motor generator. The charging control apparatus includes a communication device and a controller. The communication device is configured to receive data from a server that aggregates record data indicative of a travel record of each of the vehicles. The controller is configured to execute processing for external charging that is charging of the electric power storage device by electric power supplied from a power supply on the outside of the vehicle. The controller is configured to execute the external charging in accordance with a target value of State of Charge (SOC) of the electric power storage device. The controller is configured to lower the target value from a first target value to a second target value in a case where the controller predicts that the SOC exceeds the target value by a specified amount or larger in a section, in accordance with the record data that is aggregated in the server, when the vehicle starts traveling after completion of the external charging.

According to the above configuration, in the case where it is predicted that the SOC exceeds the target value by the specified amount or larger in the section when the vehicle starts traveling after the completion of the external charging, the target value in the external charging is lowered from the first target value to the second target value. Thus, according to this charging control apparatus, upon the completion of the external charging, a large room is secured until the SOC reaches an upper limit value in accordance with a situation. Therefore, a possibility of regenerative electric power being wasted can be reduced.

In the vehicle, the controller may be configured to increase the target value from the second target value in accordance with an amount of lacking electric power in a case where the controller predicts that the SOC reaches a lower limit value and the electric power becomes insufficient in the section, in accordance with the record data that is aggregated in the server, when the vehicle starts traveling after the completion of the external charging in accordance with the second target value.

According to the above configuration, in the case where it is predicted that the SOC reaches the lower limit value and the electric power becomes insufficient in the section when the vehicle starts traveling after the completion of the external charging in accordance with the second target value, the target value of the SOC is increased from the second target value in accordance with the amount of the lacking electric power. Thus, according to this charging control apparatus, the target value of the SOC in the external charging can be decided in a manner to prevent insufficiency of the electric power on a future travel route of the vehicle.

In the charging control apparatus, the controller may be configured to increase the target value in the external charging from the second target value in accordance with the amount of the lacking electric power in a section where the amount of the lacking electric power is the largest in a case where the controller predicts that the SOC reaches the lower limit value and the electric power becomes insufficient in the plurality of sections, in accordance with the record data that is aggregated in the server, when the vehicle starts traveling after the completion of the external charging in accordance with the second target value.

According to the above configuration, in the case where it is predicted that the SOC reaches the lower limit value and the electric power becomes insufficient in the plurality of sections when the vehicle starts traveling after the completion of the external charging in accordance with the second target value, the target value of the SOC is increased from the second target value in accordance with the amount of the lacking electric power in the section where the amount of the lacking electric power is the largest. Thus, according to this charging control apparatus, the target value of the SOC in the external charging can be decided in a manner to prevent the insufficiency of the electric power in any of the sections of the future travel route of the vehicle.

A second aspect of the present disclosure is a charging control method for a vehicle. The vehicle includes a motor generator, an electric power storage device, and a charging control apparatus. The motor generator is coupled to drive wheels. The electric power storage device is electrically connected to the motor generator. The charging control apparatus includes a communication device and a controller. The communication device is configured to receive data from a server that aggregates record data indicative of a travel record of each of the vehicles. The controller is configured to execute processing for external charging that is charging of the electric power storage device by electric power supplied from a power supply on the outside of the vehicle. The charging control method including: executing, by the controller, the external charging in accordance with a target value of State of Charge (SOC) of the electric power storage device; and lowering, by the controller, the target value from a first target value to a second target value by the controller in a case where the controller predicts that the SOC exceeds the target value by a specified amount or larger in a section in accordance with the record data that is aggregated in the server when the vehicle starts traveling after completion of the external charging.

The present disclosure can provide the charging control apparatus and the charging control method capable of reducing the possibility of the regenerative electric power in the vehicle being wasted.

BRIEF DESCRIPTION OF THE DRAWINGS

Features, advantages, and technical and industrial significance of exemplary embodiments will be described below with reference to the accompanying drawings, in which like numerals denote like elements, and wherein.

DETAILED DESCRIPTION OF EMBODIMENTS

Figure 1:
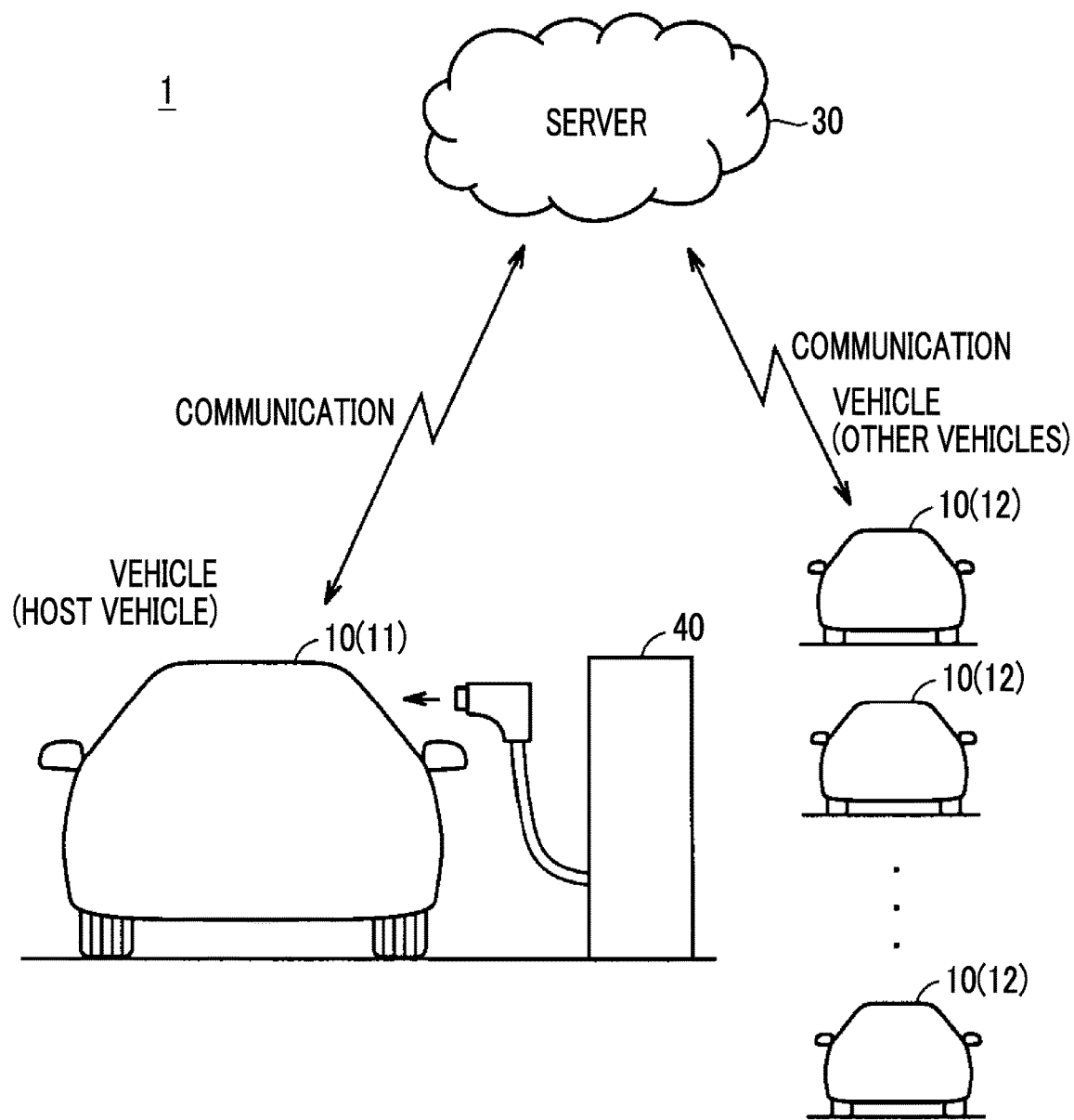
FIG. 1 is a system configuration diagram.

A detailed description will hereinafter be made on an embodiment with reference to the drawings. Note that the same or corresponding portions in the drawings are denoted by the same reference numerals and the description thereon will not be repeated.

System Configuration

FIG. 1 is a configuration diagram of a system 1 to which a vehicle 10 according to this embodiment is applied. Referring to FIG. 1, the system 1 includes the plurality of vehicles 10 and a server 30. Note that, in this embodiment, the plurality of vehicles 10 are vehicles of the same type. Thus, the plurality of vehicles 10 has equivalent specifications.

The vehicle 10 is a connected vehicle that is continuously connected to a network during actuation of a vehicle system. The vehicle 10 is also an electric vehicle (EV) that includes a motor as a drive power source. The vehicle 10 can perform external charging in which an in-vehicle electric power storage device stores electric power supplied from a charging stand 40.

The vehicle 10 is configured to send identification (ID) that is allocated to each of the vehicles 10 and record data (for example, global positioning system (GPS) data and SOC data of the in-vehicle electric power storage device) indicative of a travel record to the server 30 in specified cycles. The specified cycle is a predetermined time interval and is a time interval of 15 seconds or 30 seconds, for example. Hereinafter, a certain vehicle of the plurality of vehicles 10 will also be referred to as a "host vehicle 11", and the vehicles 10 other than the host vehicle 11 will also be referred to as "other vehicles 12" as a matter of convenience.

The server 30 is configured to receive the ID and the record data from each of the vehicles 10 in specified cycles. In the server 30, a database that manages a transition of the SOC per vehicle is constructed by aggregating the record data of each of the vehicles 10. This database manages the transition of the SOC of each of the vehicles 10 that start traveling from the charging stand 40, and manages the transition of the SOC per starting point (the charging stand 40). Note that the charging stands 40 are installed throughout a country. A detailed description on the database will be made below.

For example, the vehicle 10 performs the external charging by using the charging stand 40. In this case, before the external charging is started, a predicted transition result of the SOC in future travel of the vehicle 10 is sent from the server 30 to the vehicle 10 in response to a request from the vehicle 10. In the vehicle 10, by referring to the received prediction result, a target value of the SOC (hereinafter also referred to as a "target SOC") in the external charging is decided. A detailed description thereon will be made below.

Detailed Configurations of Vehicle (EV), Server, and Charging Stand

Figure 2:
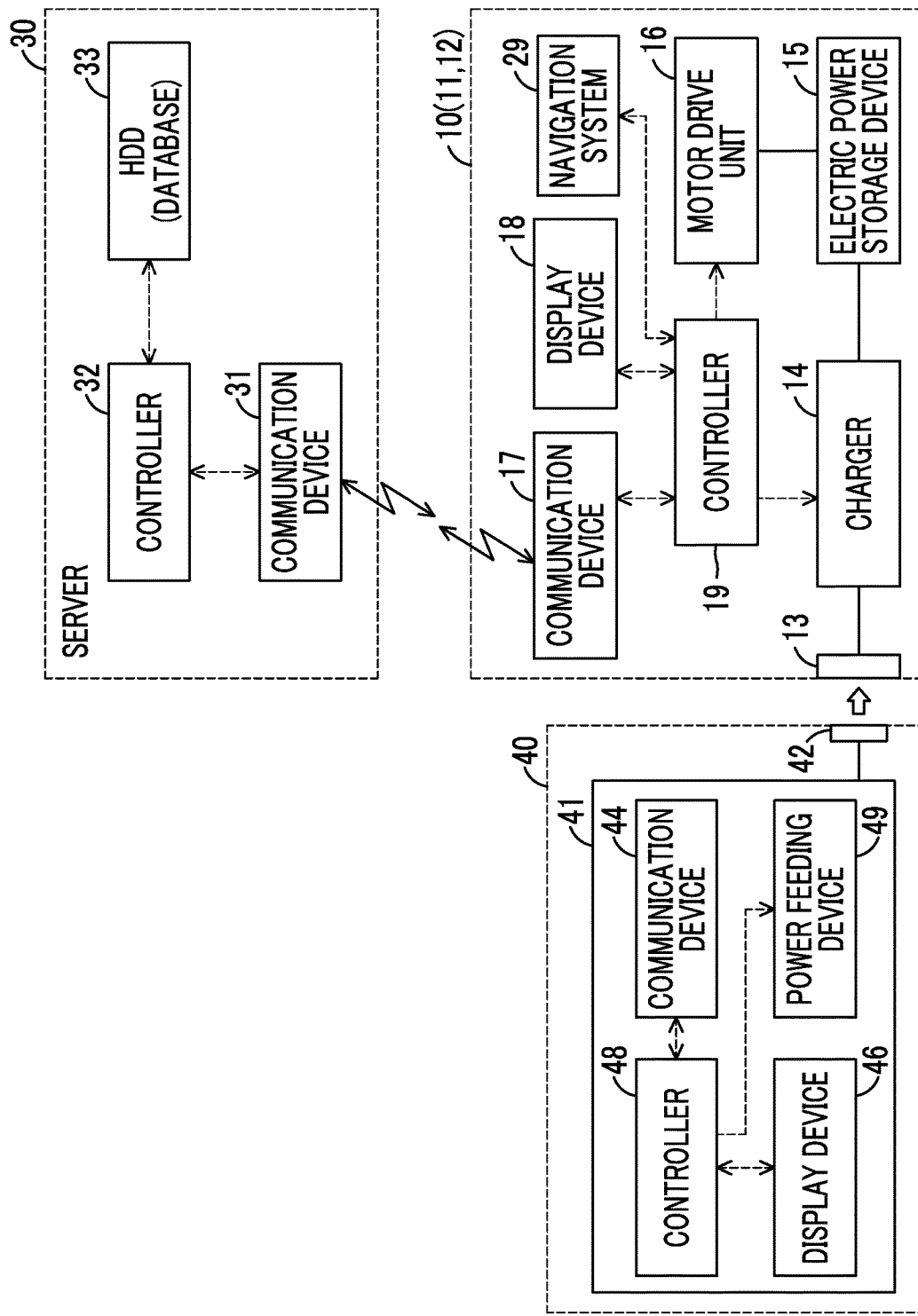
FIG. 2 is a detailed diagram of configurations of a vehicle, a charging stand, and a server.

FIG. 2 is a further detailed diagram of configurations of the vehicle 10, the server 30, and the charging stand 40. Referring to FIG. 2, the vehicle 10 includes an inlet 13, a charger 14, an electric power storage device 15, a motor drive unit 16, a communication device 17, a display device 18, a navigation system 29, and a controller 19. The server 30 includes a communication device 31, a controller 32, and a hard disk drive (HDD) 33. The charging stand 40 includes a power feeding facility 41 and a connector 42.

First, the configuration of the charging stand 40 will be described. The connector 42 is configured to be connectable to the inlet 13 of the vehicle 10. The electric power supplied from the power feeding facility 41 is supplied to the vehicle 10 via the connector 42. The power feeding facility 41 includes a power feeding device 49, a communication device 44, a display device 46, and a controller 48. The power feeding device 49 is configured to supply the electric power to the vehicle 10 by using the electric power supplied from a system power supply, for example.

The communication device 44 is configured to be wirelessly communicable with the server 30 (the communication device 31), for example. The display device 46 is a display device that is configured to display information on the external charging. The controller 48 includes a CPU and memory, which are not shown, therein and controls equipment (the communication device 44, the display device 46, the power feeding device 49, and the like) of the charging stand 40 on the basis of information stored in the memory and information from each sensor.

Next, the configuration of the server 30 will be described. The communication device 31 is configured to be wirelessly communicable with the vehicle 10 (the communication device 17) and the charging stand 40 (the communication device 44), for example. The communication device 31 is connected to the controller 32 by a communication line, sends information that is transmitted from the controller 32 to the vehicle 10, and transmits information that is received from the vehicle 10 to the controller 32. As described above, the communication device 31 receives the record data (for example, the GPS data and the SOC data) indicative of the travel record and the ID of each of the vehicles 10 from each of the vehicles 10 in the specified cycles, for example.

The controller 32 includes a central processing unit (CPU) and memory, which are not shown, therein and is configured to control equipment (the communication device 31, the HDD 33, and the like) of the server 30 in accordance with a control program stored in the memory.

The HDD 33 is a storage device that stores various types of data. The HDD 33 stores the record data (for example, the GPS data and the SOC data), which is received from each of the vehicles 10 in the specified cycles, in association with the ID of each of the vehicles 10. The HDD 33 also stores the above-described database (the database that manages the transition of the SOC of each of the vehicles 10 per starting point (the charging stand 40)).

Figure 3:
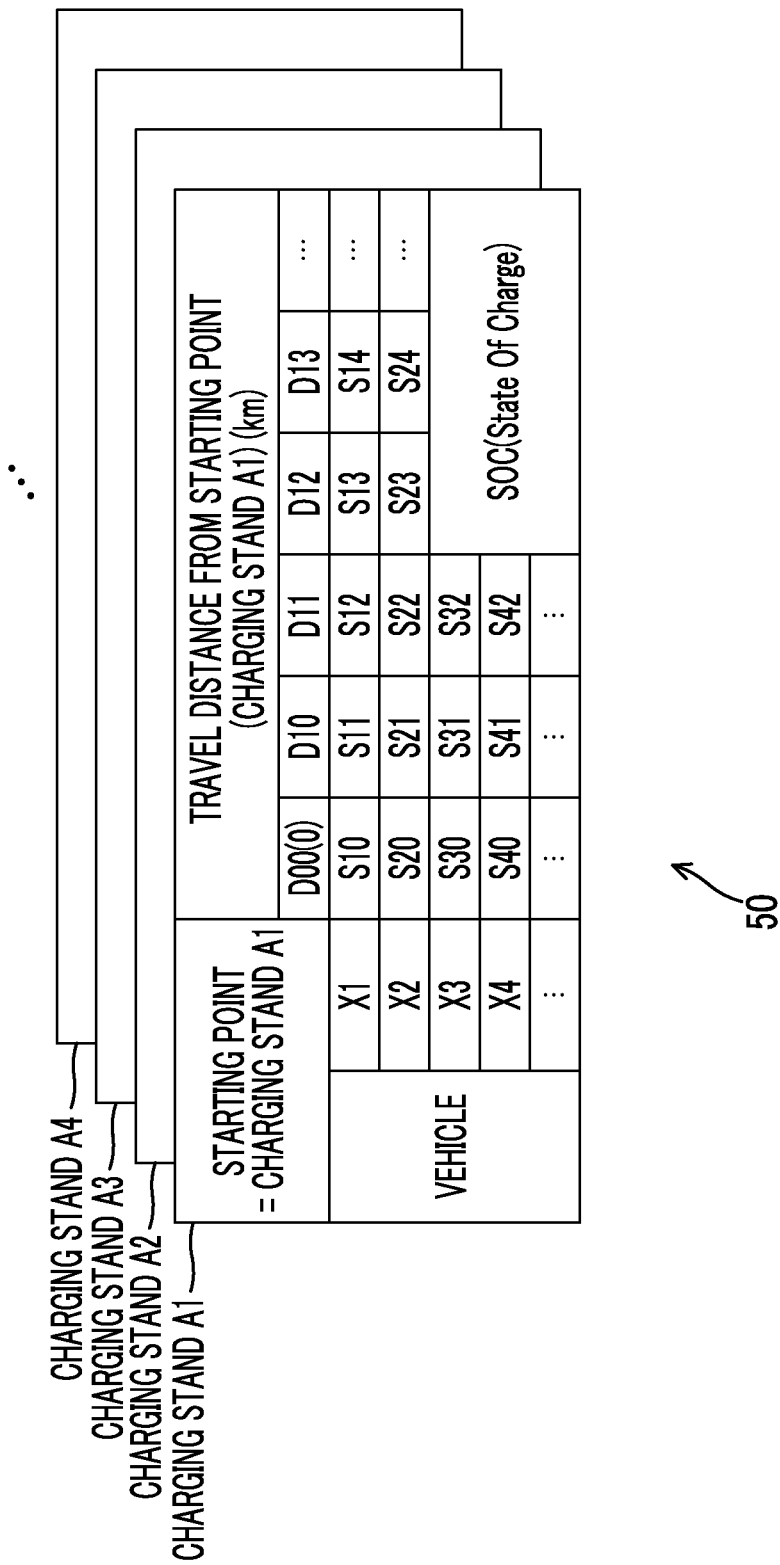
FIG. 3 is a table that shows one example of a database stored in an HDD.

FIG. 3 is a table that shows one example of a database 50 stored in the HDD 33. Referring to FIG. 3, the database 50 manages the SOC data (for example, S10 to S42) of the vehicles 10 (for example, vehicles X1 to X4) by a travel distance from the starting point (for example, D00 to D13) in association with the starting point (for example, charging stands A1 to A4). An interval of the travel distance, at which the SOC data is managed, is a specified interval. As the specified interval, any of intervals from several tens of meters to several kilometers is adopted, for example.

Next, a description will be made on a generation method of the database 50. For example, the controller 32 extracts the SOC data at a time point at which the vehicle X1 leaves the charging stand A1 from the record data of the vehicle X1 that is stored in the HDD 33. More specifically, of the record data of the vehicle X1, the controller 32 extracts the SOC data that is associated with the GPS data indicative of the vicinity of the charging stand A1 (within several meters to several tens of meters in radius, for example). The controller 32 also extracts the SOC data from the record data of the vehicle X1 that is stored in the HDD 33 every time the vehicle X1 (the vehicle 10) advances for the specified interval after leaving the charging stand A1 (the charging stand 40). Note that whether the SOC data is the SOC data at a point at which the vehicle X1 has advanced for the specified interval is determined by referring to the GPS data that is associated with the SOC data. In a similar method, the controller 32 extracts the SOC data every time each of the vehicles 10 that leaves the charging stand advances for the specified interval. In this way, the database 50 (FIG. 3) is generated.

Referring again to FIG. 2, the configuration of the vehicle 10 will next be described. The inlet 13 is configured to be connectable to the connector 42 of the power feeding facility 41 that is provided in the charging stand 40. The charger 14 is provided between the inlet 13 and the electric power storage device 15, converts the electric power received from the charging stand 40 to the electric power storable in the electric power storage device 15, and outputs the converted electric power to the electric power storage device 15.

The electric power storage device 15 is an electric power storing element that is configured to be chargeable and dischargeable. The electric power storage device 15 is configured by including a secondary battery such as a lithium-ion battery, a nickel-metal hydride battery, or a lead-acid battery and a power storage element such as an electric double-layered capacitor.

The motor drive unit 16 is electrically connected to the electric power storage device 15. The motor drive unit 16 generates vehicle drive power by using the electric power that is supplied from the electric power storage device 15. The motor drive unit 16 includes: a motor generator that is mechanically connected (coupled) to drive wheels; and a power control unit (an inverter and the like) that controls an energization amount of the motor generator. Output of the motor drive unit 16 (the energization amount of the motor generator) is controlled by a control signal from the controller 19.

The communication device 17 is configured to be wirelessly communicable with the server 30 (the communication device 31), for example. The communication device 17 is connected to the controller 19 by a communication line, sends information that is transmitted from the controller 19 to the server 30, and transmits information that is received from the server 30 to the controller 19. As described above, the communication device 17 sends the record data and the ID of the corresponding vehicle 10 to the server 30 in the specified cycles.

The display device 18 is a display device that is configured to display information on the external charging and the like. The navigation system 29 is a system that guides a user through a route to a destination. In the navigation system 29, internal memory (not shown) stores map information, for example. The navigation system 29 displays a current location of the vehicle 10 on a map by using information indicative of the current location of the vehicle 10, which is acquired by using the GPS, and the map information.

The controller 19 includes a CPU and memory, which are not shown, therein and controls equipment (the charger 14, the motor drive unit 16, the communication device 17, the display device 18, the navigation system 29, and the like) of the vehicle 10 on the basis of information stored in the memory and information from each sensor. Note that a configuration including the controller 19 and the communication device 17 is one example of the "charging control apparatus".

The controller 19 is configured to compute the SOC of the electric power storage device 15 by using an integrated value of output of a current sensor (not shown) that detects a current of the electric power storage device 15, for example.

In addition, the controller 19 stores data indicative of an upper limit value and a lower limit value of the SOC as well as the target SOC in the external charging in the internal memory. The controller 19 controls the charger 14 such that the external charging continues until the SOC of the electric power storage device 15 reaches the target SOC. Note that the target SOC is set to a first target SOC (for example, 80%) by default. The controller 19 changes the target SOC in accordance with a situation. Next, a detailed description will be made on a decision method of the target SOC in the external charging.

Decision on Target SOC

The motor generator that is provided in the motor drive unit 16 is configured to perform regenerative power generation during deceleration of the vehicle 10, during a reduction in acceleration of the vehicle 10 on a downhill road, and the like, for example. Regenerative electric power that is generated by the regenerative power generation is stored in the electric power storage device 15. However, in the case where the SOC of the electric power storage device 15 has reached the upper limit value, the electric power storage device 15 can no longer store the regenerative electric power even when the regenerative electric power is generated. Accordingly, in the case where the external charging is performed at the charging stand 40 installed on top of a mountain, for example, such that the SOC reaches a value near the upper limit value, the regenerative electric power that is generated at a time when the vehicle travels down the mountain may not sufficiently be stored in the electric power storage device 15. In such a case, some of the regenerative electric power is possibly wasted.

Figure 4:
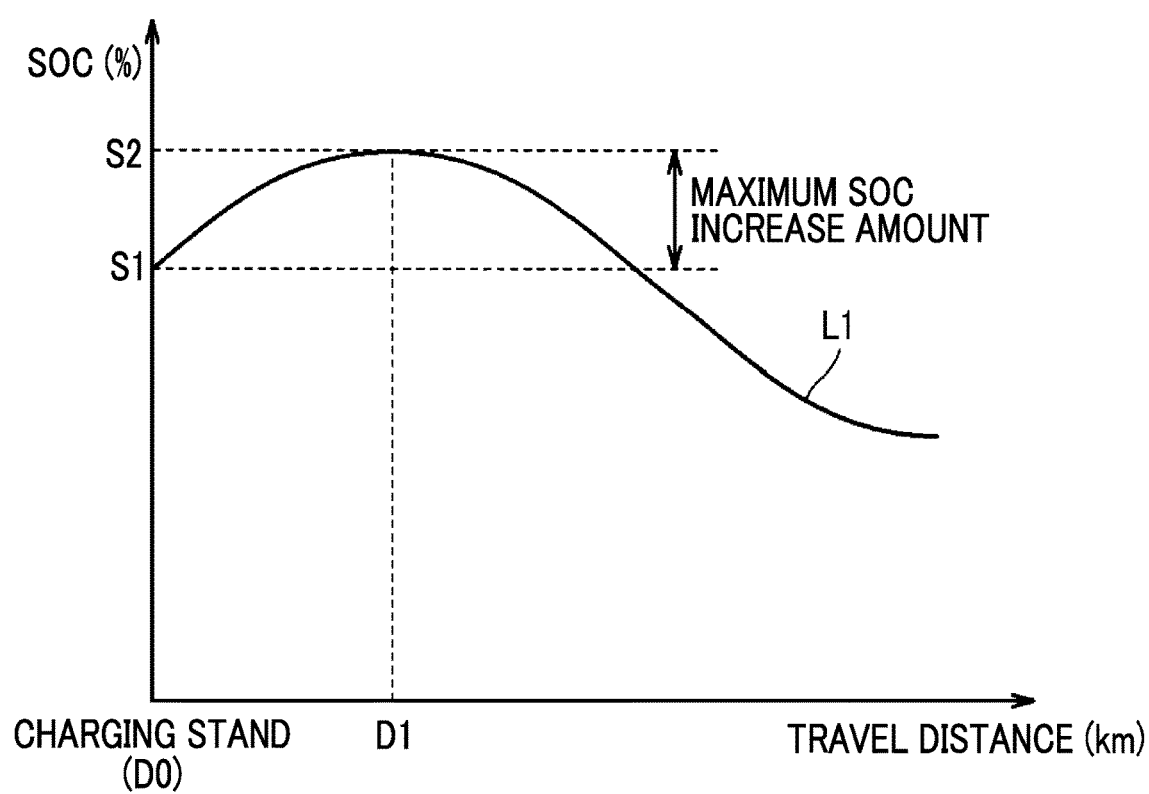
FIG. 4 is a chart that illustrates an example in which an SOC exceeds the SOC after completion of external charging due to travel of the vehicle after the completion of the external charging.

FIG. 4 is a chart that illustrates an example in which the SOC exceeds the SOC after completion of the external charging due to travel of the vehicle 10 after the completion of the external charging. A horizontal axis represents the travel distance of the vehicle 10, and a vertical axis represents the SOC of the electric power storage device 15.

Referring to FIG. 4, a travel distance D0 point (0 km) is the installation location of the charging stand 40. The external charging is supposedly performed by using the charging stand 40 until the SOC of the electric power storage device 15 reaches S1 (the target SOC). A route from the D0 point to a D1 point is a downhill road. In this case, the regenerative electric power is generated from the D0 point to the D1 point by the reduction in the acceleration of the vehicle 10 and the like, and the SOC of the electric power storage device 15 is increased from S1 to S2, for example. Thereafter, an uphill road or a flat road mainly continues, and the SOC of the electric power storage device 15 is gradually reduced from S2.

In the example shown in FIG. 4, an increase amount of the SOC (hereinafter also simply referred to as an "SOC increase amount") that is compared to the SOC upon the completion of the external charging (at the travel distance D0 point) becomes the maximum at the travel distance D1 point. Hereinafter, a maximum value of the SOC increase amount will also be referred to as a "maximum SOC increase amount". For example, in the case where the upper limit value of the SOC is positioned between S1 and S2, the regenerative electric power that is generated in a period from a time point at which the SOC reaches the upper limit value to a time point at which the SOC starts being reduced is not stored in the electric power storage device 15 and thus is wasted.

For example, in the case where it is acknowledged in advance that the SOC is stuck to the upper limit value due to the travel of the host vehicle 11 after the completion of the external charging, a possibility of the regenerative electric power being wasted can be reduced by lowering the target SOC (S1) in the external charging.

Accordingly, in the vehicle 10 (the host vehicle 11) according to this embodiment, in the case where it is predicted that the SOC exceeds the target SOC (the first target SOC) by a specified amount or larger in a section, in accordance with the record data (the record data of the other vehicles 12) that is aggregated in the server 30, when the host vehicle 11 starts traveling after the completion of the external charging, the controller 19 lowers the target SOC from the first target SOC to a second target SOC (the second target SOC<the first target SOC).

The specified amount is, for example, the upper limit value of the SOC—the target SOC (the first target SOC). In this embodiment, the controller 19 determines whether the maximum SOC increase amount is equal to or larger than the specified amount and thereby predicts whether the SOC exceeds the target SOC (the first target SOC) by the specified amount or larger in the section when the host vehicle 11 starts traveling after the completion of the external charging. That is, when the maximum SOC increase amount is equal to or larger than the specified amount, it is predicted that the SOC exceeds the first target SOC by the specified amount or larger in the section by the future travel of the host vehicle 11.

According to the vehicle 10, upon the completion of the external charging, a large room is secured until the SOC reaches the upper limit value in accordance with the situation. Thus, the possibility of the regenerative electric power being wasted can be reduced.

Note that the second target SOC is a value that is obtained by subtracting (the maximum SOC increase amount—the specified amount) or a value that exceeds (the maximum SOC increase amount—the specified amount) from the first target SOC. In this way, it is possible to reduce such a possibility that the SOC of the electric power storage device 15 exceeds the upper limit value due to the travel of the vehicle 10 after the completion of the external charging.

Prediction Method of Maximum SOC Increase Amount

Next, a description will be made on one example of a prediction method of the maximum SOC increase amount in the case where the host vehicle 11 starts traveling after the completion of the external charging. First, the host vehicle 11 sends data (the GPS data) indicative of the current location (the location of the charging stand) to the server 30. The controller 32 of the server 30 searches the charging stand 40 that corresponds to the received GPS data (for example, the charging stand A1 (FIG. 3)) on the database 50 (FIG. 3). For example, the controller 32 searches the charging stand 40 that exists within several meters to several tens of meters in radius from the point indicated by the received GPS data.

In the case where the charging stand A1 is found, the controller 32 extracts the SOC data of the other vehicle(s) 12 that is associated with the charging stand A1. For example, the controller 32 extracts the SOC data at each of the travel distances up to a specified travel distance (for example, D13 (FIG. 3)). In the case where the data of the plurality of other vehicles 12 is found, the controller 32 computes an average value of a plurality of types of the SOC data (hereinafter also referred to as "average SOC data") per travel distance. There is a case where an initial value (the SOC at the time point of leaving the charging stand 40) differs in each of the types of the data of the plurality of other vehicles 12. However, the average value of the SOC data of the plurality of other vehicles 12 represents an average change amount of the SOC in the plurality of other vehicles 12 (how much the SOC is increased by the future travel of the host vehicle 11 and the like).

The controller 32 predicts the transition of the SOC (for example, a transition L1 of the SOC (FIG. 4)) by executing known interpolation processing, for example, on the basis of the computed average SOC data per travel distance. The server 30 sends data indicative of the predicted transition of the SOC to the host vehicle 11. By referring to the received data indicative of the transition of the SOC, the controller 19 extracts the maximum value of the SOC (for example, S2 (FIG. 4)) and the initial value of the SOC (for example, S1 (FIG. 4)) in the future transition of the SOC and subtracts the initial value of the SOC from the maximum value of the SOC, so as to compute the maximum SOC increase amount.

As described above, in the case where it is determined that the maximum SOC increase amount is equal to or larger than the specified amount (the upper limit value of the SOC—the target SOC (the first target SOC)), there is a high possibility that the SOC exceeds the upper limit value due to the future travel of the vehicle 10. Accordingly, the controller 19 lowers the target SOC from the first target SOC to the second target SOC.

Procedure of Target SOC Decision Processing

Figure 5:
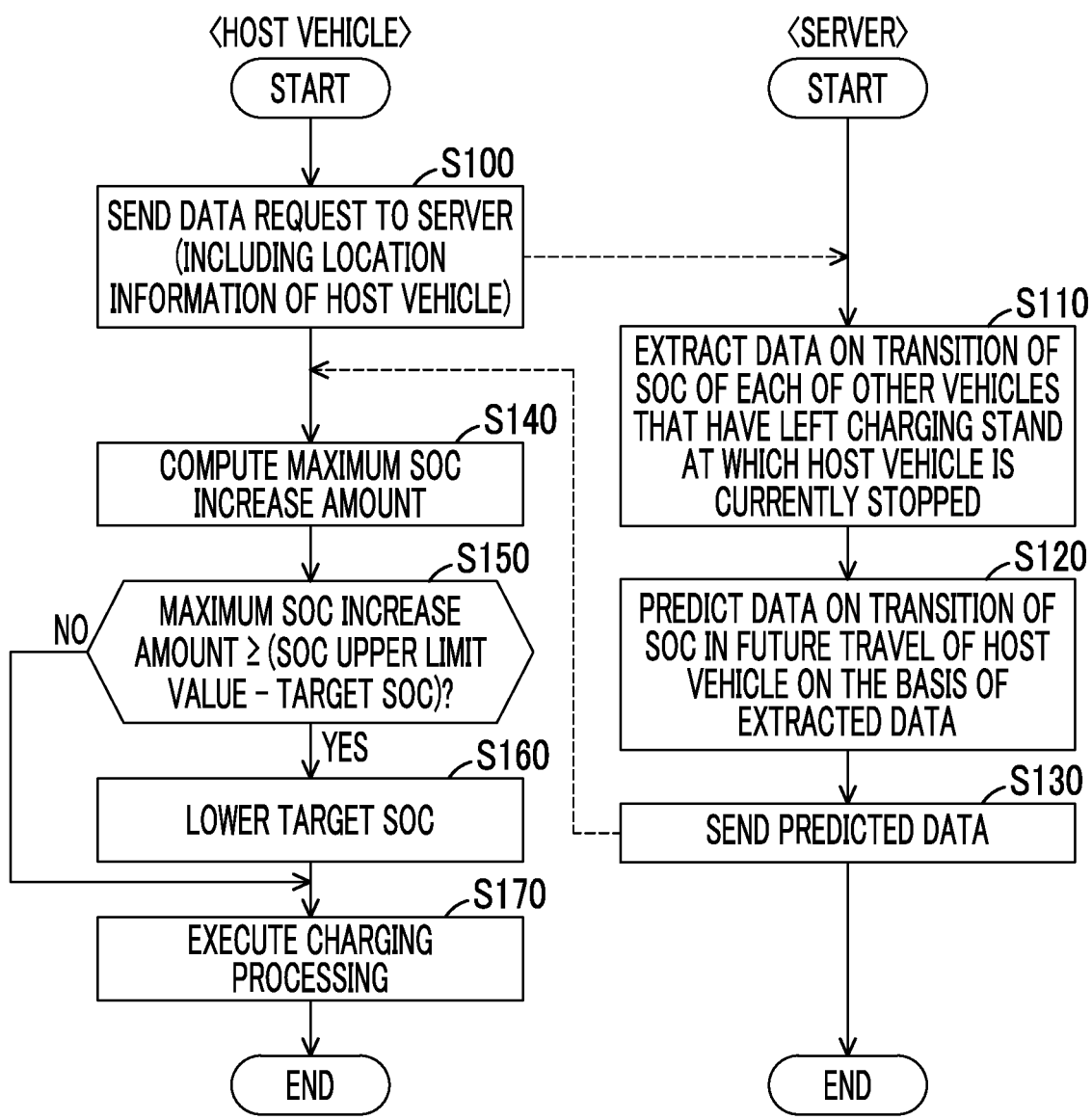
FIG. 5 is a flowchart of a procedure of target SOC decision processing.

FIG. 5 is a flowchart of a procedure of target SOC decision processing. The processing shown in the flowchart on the left is executed by the host vehicle 11. The processing shown in the flowchart on the right is executed by the server 30. The processing shown by these flowcharts is executed after the connector 42 is connected to the inlet 13 for the external charging, for example.

Referring to FIG. 5, the controller 19 acquires the GPS data from the navigation system 29 and controls the communication device 17 to send a data request for requesting the predicted data on the transition of the SOC in the future travel and the acquired GPS data to the server 30 (step S100).

When the server 30 receives the data request from the host vehicle 11 via the communication device 31, the controller 32 refers to the database 50 (FIG. 3) so as to extract the SOC data per travel distance of each of the other vehicles 12 that have left the charging stand near a stop location of the host vehicle 11 (the location indicated by the received GPS data) (the data on the transition of the SOC in each of the other vehicles 12) (step S110).

The controller 32 computes the average SOC data per travel distance, for example, on the basis of the extracted SOC data and predicts the transition of the SOC on the basis of the computed average SOC data per travel distance (step S120). The controller 32 controls the communication device 31 so as to send the data indicative of the predicted transition of the SOC to the host vehicle 11 (step S130).

After sending the data request to the server 30 in step S100, the controller 19 monitors whether the predicted data on the transition of the SOC has been received. Once reception of the predicted data on the transition of the SOC from the server 30 is confirmed, the controller 19 computes the maximum SOC increase amount on the basis of the predicted data on the transition of the SOC that has been received (step S140).

Thereafter, the controller 19 determines whether the computed maximum SOC increase amount is equal to or larger than a difference between the upper limit value of the SOC and the target SOC (the first target SOC) (the specified amount) (step S150). If it is determined that the maximum SOC increase amount is equal to or larger than the difference between the upper limit value of the SOC and the target SOC (YES in step S150), the controller 19 lowers the target SOC from the first target SOC to the second target SOC (step S160). Thereafter, the controller 19 executes the processing for the external charging in accordance with the second target SOC (step S170).

On the other hand, if it is determined that the maximum SOC increase amount is smaller than the difference between the upper limit value of the SOC and the target SOC (NO in step S150), the controller 19 executes the processing for the external charging in accordance with the first target SOC (in a state of maintaining the target SOC to the first target SOC) (step S170).

As it has been described so far, in the vehicle 10 according to this embodiment, in the case where it is predicted that the SOC exceeds the target SOC (the first target SOC) by the specified amount or larger in the section, in accordance with the record data that is aggregated in the server 30, when the host vehicle 11 starts traveling after the completion of the external charging, the controller 19 lowers the target SOC from the first target SOC to the second target SOC. Thus, according to the vehicle 10, upon the completion of the external charging, the large room is secured until the SOC reaches the upper limit value in accordance with the situation. Therefore, the possibility of the regenerative electric power being wasted can be reduced.

MODIFIED EXAMPLE

In the above embodiment, in order to avoid a situation where the regenerative electric power is wasted after the completion of the external charging, in the case where it is predicted that the maximum SOC increase amount in the future travel is equal to or larger than the specified amount, the target SOC in the external charging is lowered from the first target SOC to the second target SOC. In regard to the vehicle 10 according to this modified example, attention is focused on such a point that, due to lowering of the target SOC to the second target SOC, the SOC of the electric power storage device 15 possibly reaches a lower limit value before a sufficient amount of the regenerative electric power is collected.

Figure 6:
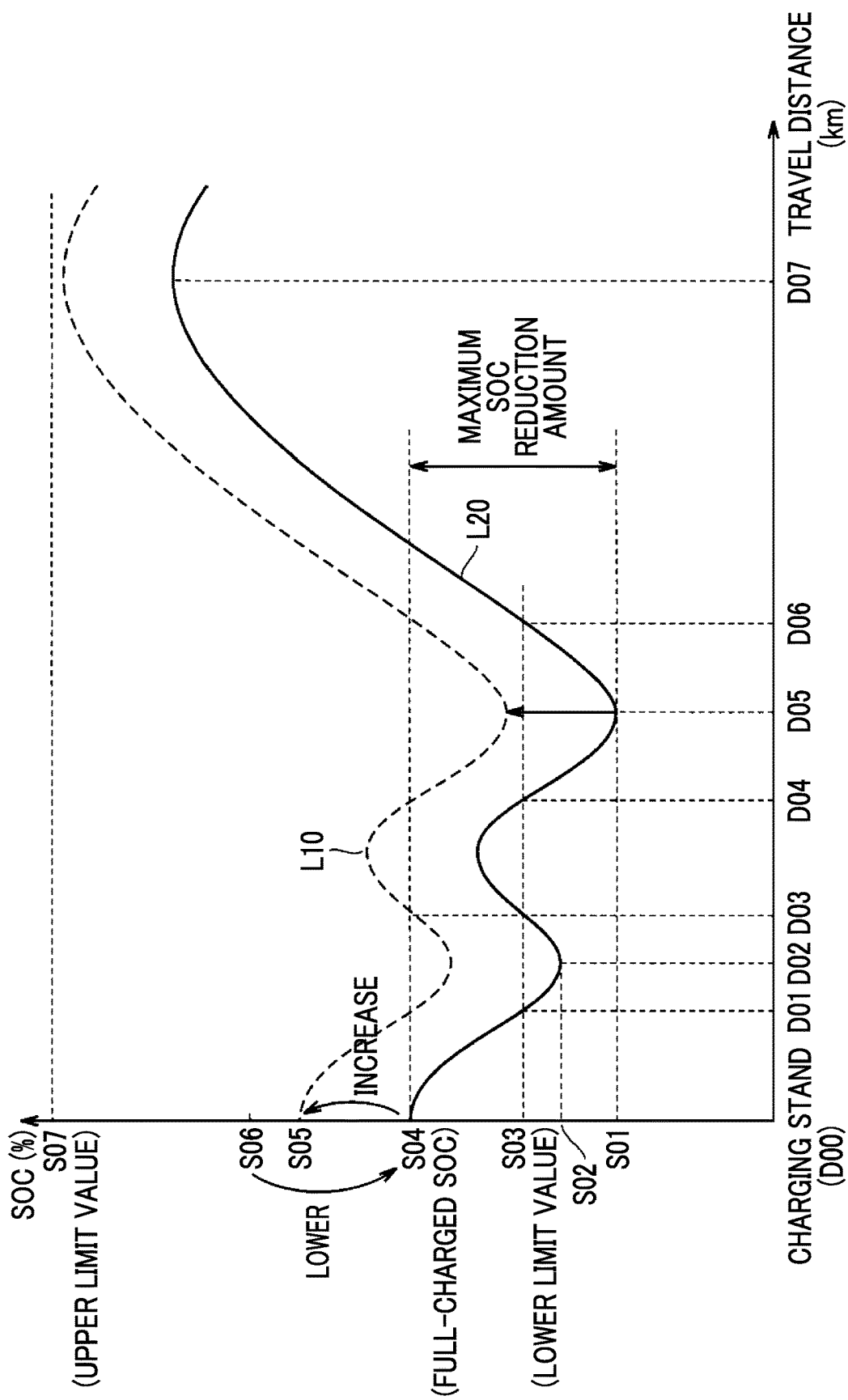
FIG. 6 is a chart that illustrates an example in which the SOC of an electric power storage device reaches a lower limit value before a sufficient amount of regenerative electric power is collected.

FIG. 6 is a chart that illustrates an example in which the SOC of the electric power storage device 15 reaches the lower limit value before the sufficient amount of the regenerative electric power is collected. A horizontal axis represents the travel distance of the vehicle 10, and a vertical axis represents the SOC of the electric power storage device 15.

Referring to FIG. 6, a transition L20 of the SOC represents a prediction result of the transition of the SOC in the future travel of the host vehicle 11 after the target SOC is lowered from S06 (the first target SOC) to S04 (the second target SOC). Data indicative of the transition L20 of the SOC is computed by changing the entire data indicative of the transition of the SOC that is received from the server 30 (the predicted data based on the record data of the plurality of other vehicles 12) in accordance with a change in the initial value (the target SOC), for example. By lowering the target SOC to S04, the SOC falls below the upper limit value (S07) at a travel distance D07 point at which the SOC becomes the maximum.

However, the SOC falls below the lower limit value (S03) in a section between the travel distances D01 and D03 and a section between the travel distances D04 and D06. For example, the electric power that lacks in the section from D01 to D03 is the electric power that corresponds to S03-S02 (hereinafter also referred to as "first lacking electric power", and the electric power that lacks in the section from D04 to D06 is the electric power that corresponds to S03-S01 (hereinafter also referred to as "second lacking electric power"). The second lacking electric power is greater than the first lacking electric power. In particular, the vehicle 10 is the EV. Accordingly, when the SOC of the electric power storage device 15 reaches the lower limit value, it becomes difficult for the vehicle 10 to continue the travel.

In view of the above, in the vehicle 10 (the host vehicle 11) according to this modified example, in the case where it is predicted that the SOC reaches the lower limit value and the electric power becomes insufficient in the section when the host vehicle 11 starts traveling after the completion of the external charging in accordance with the second target SOC, in accordance with the record data (the record data of the other vehicles 12) that is aggregated in the server 30, the controller 19 increases the target SOC from the second target SOC in accordance with an amount of the lacking electric power. In particular, in the case where it is predicted that the SOC reaches the lower limit value and the electric power becomes insufficient in the plurality of sections, the controller 19 increases the target SOC from the second target SOC in accordance with the amount of the lacking electric power in the section where the amount of the lacking electric power is the largest.

That is, in the example shown in FIG. 6, the controller 19 increases the target SOC from S04 (the second target SOC) to S05 in accordance with the amount of the second lacking electric power in the section between the travel distances D04 and D06 (the section where the amount of the lacking electric power is the largest). In this way, the future transition of the SOC in the vehicle 10 is represented by L10. Thus, the electric power never becomes insufficient in any of the sections of the future travel route of the vehicle 10.

Procedure of Target SOC Decision Processing

Figure 7:
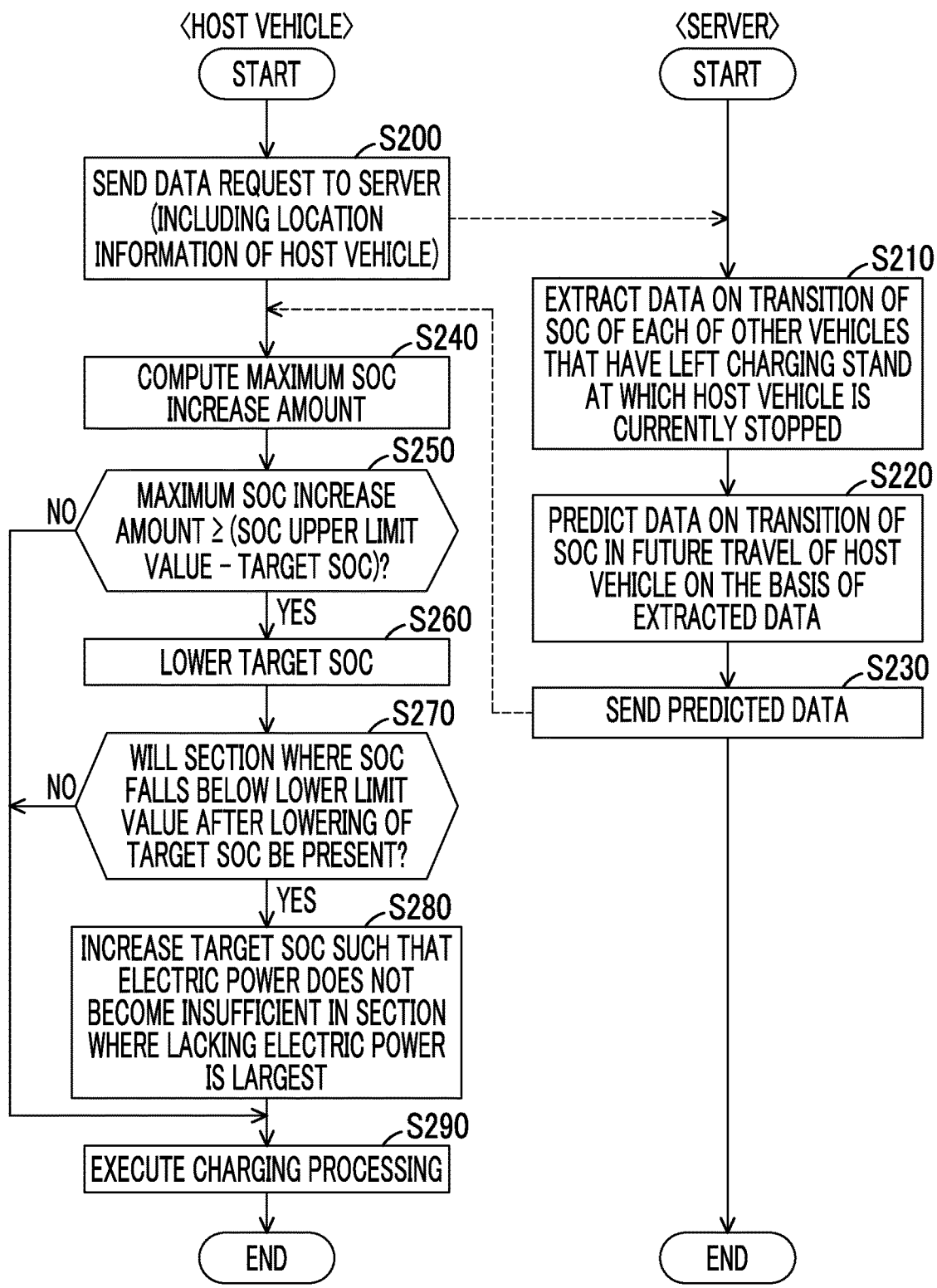
FIG. 7 is a flowchart of a procedure of the target SOC decision processing in a modified example.

FIG. 7 is a flowchart of a procedure of the target SOC decision processing in this modified example. The processing shown in the flowchart on the left is executed by the host vehicle 11. The processing shown in the flowchart on the right is executed by the server 30. The processing shown by these flowcharts is executed after the connector 42 is connected to the inlet 13 for the external charging, for example. Because the processing shown in steps S200 to S260 and S290 are respectively the same as the processing shown in steps S100 to S160 and S170 in FIG. 5, the description thereon will not be made.

Referring to FIG. 7, if the target SOC is lowered to the second target SOC in step S260, the controller 19 determines whether a section where the SOC falls below the lower limit value (a section where the electric power becomes insufficient) will be present when the host vehicle 11 starts traveling after the completion of the external charging in accordance with the second target SOC (step S270).

For example, by referring to the data indicative of the predicted transition of the SOC after the target SOC is lowered to the second target SOC (for example, the transition L20 of the SOC (FIG. 6)), the controller 19 extracts the minimum value of the SOC (for example, S01 (FIG. 6)) and the initial value of the SOC (for example, S04 (FIG. 6)) in the future transition of the SOC, and subtracts the minimum value of the SOC from the initial value of the SOC to compute a maximum SOC reduction amount. Then, if the maximum SOC reduction amount is larger than a value that is obtained by subtracting the lower limit value of the SOC (for example, S03 (FIG. 6)) from the initial value of the SOC, the controller 19 determines that the section where the SOC falls below the lower limit value (the section where the electric power becomes insufficient) will be present when the host vehicle 11 starts traveling after the completion of the external charging in accordance with the second target SOC.

If it is determined that the section where the SOC falls below the lower limit value will be present (YES in step S270), the controller 19 increases the target SOC such that the electric power does not become insufficient in the section where the amount of the lacking electric power is the largest (step S280). For example, the controller 19 increases the target SOC by adding the lacking electric power (for example, S03-S01 in FIG. 6) or the larger value than the lacking electric power to the second target SOC. Thereafter, the controller 19 executes the processing for the external charging in accordance with the increased target SOC (step S290).

On the other hand, if it is determined that the section where the SOC falls below the lower limit value will not be present (NO in step S270), the controller 19 executes the processing for the external charging in accordance with the second target SOC (in a state of maintaining the target SOC to the second target SOC) (step S290).

As it has been described so far, in the vehicle 10 according to this modified example, in the case where it is predicted that the SOC reaches the lower limit value and the electric power becomes insufficient in the section, in accordance with the record data (the record data of the other vehicles 12) that is aggregated in the server 30, when the host vehicle 11 starts traveling after the completion of the external charging in accordance with the second target SOC the controller 19 increases the target SOC from the second target SOC in accordance with the amount of the lacking electric power. Accordingly, according to the vehicle 10, the target value of the SOC in the external charging can be decided such that the electric power does not become insufficient on the future travel route of the vehicle 10.

Other Embodiments

In the above embodiment, the target SOC decision processing for the external charging is executed in the vehicle 10. However, the target SOC decision processing does not always have to be executed in the vehicle 10. For example, the target SOC decision processing may be executed in the charging stand 40. In this case, of the processing in the flowcharts shown in FIG. 5 and FIG. 7, the processing that is executed by the controller 19 of the host vehicle 11 is executed by the controller 48 of the charging stand 40, for example. In addition, all of the processing executed by the controller 19 does not always have to be executed by the controller 48. The controller 48 only has to execute processing to change the target SOC at least in the case where it is predicted that the SOC exceeds the target SOC by the specified amount or larger in the section when the host vehicle 11 starts traveling after the completion of the external charging. In this case, the communication device 44 communicates with the communication device 31 of the server 30. That is, in the above embodiment, the "charging control apparatus" is mounted on the vehicle 10. However, the "charging control apparatus" may be mounted on the charging stand 40.

In the above embodiment, the vehicle 10 is the electric vehicle. However, the vehicle 10 does not always have to be the electric vehicle and may be a plug-in hybrid vehicle (PHV), for example. The vehicle 10 only has to be chargeable externally and be able to generate the regenerative power.

In the above embodiment, the vehicle 10 is continuously connected to the network. However, the vehicle 10 does not always have to be connected to the network. The vehicle 10 only has to be communicable with the server 30 when necessary, for example.

In the above embodiment, in the case where the maximum SOC increase amount is equal to or larger than the specified amount (the upper limit value of the SOC—target SOC), the target SOC is lowered from the first target SOC to the second target SOC. That is, when it is predicted that the SOC exceeds the upper limit value due to the future travel of the host vehicle 11, the target SOC is lowered. However, the controller 19 may lower the target SOC even when it is not necessarily predicted that the SOC exceeds the upper limit value. For example, the controller 19 may lower the target SOC in the case where the maximum SOC increase amount is equal to or larger than a value (>0) that is smaller than the value of (the upper limit value of the SOC—target SOC).

In the above embodiment, the server 30 predicts the transition of the SOC that is occurred by the travel of the host vehicle 11 after the external charging. However, the server 30 does not always have to predict the transition of the SOC. For example, the transition of the SOC may be predicted in the vehicle 10. In this case, the SOC data per travel distance of each of the plurality of other vehicles 12 is sent from the server 30 to the host vehicle 11, the plurality of other vehicles 12 having left the charging stand 40 that the host vehicle 11 is about to use. Then, the transition of the SOC is predicted in the host vehicle 11 on the basis of the received data.

In the above embodiment, in order to predict the transition of the SOC that is occurred by the travel of the host vehicle 11 after the external charging, only the SOC data of each of the other vehicles 12 is used, the other vehicles 12 having started traveling from the charging stand 40 that the host vehicle 11 is about to use. However, the data that is used to predict the transition of the SOC is not limited to the SOC data of the other vehicles 12. For example, in the case where the host vehicle 11 has started traveling from the same charging stand 40 in the past, in addition to the SOC data of the other vehicles 12, the SOC data of the host vehicle 11 may be used to predict the transition of the SOC.

In the above embodiment, in the case where the maximum SOC increase amount is equal to or larger than the specified amount, the controller 19 lowers the target SOC from the first target SOC to the second target SOC. However, in the case where the maximum SOC increase amount is equal to or larger than the specified amount, the controller 19 does not always have to lower the target SOC. For example, in the case where the maximum SOC increase amount is equal to or larger than the specified amount, the controller 19 may check with the user whether to lower the target SOC. More specifically, in the case where the maximum SOC increase amount is equal to or larger than the specified amount, the controller 19 causes the display device 18 to display a screen for checking with the user whether to lower the target SOC. When the user selects an option to permit lowering of the target SOC, the controller 19 lowers the target SOC. On the other hand, when the user selects an option to disallow lowering of the target SOC, the controller 19 does not lower the target SOC. In this way, the user's intention can be reflected on the decision on the target SOC.

It should be understood that the embodiments disclosed herein are illustrative in all respects and not restrictive. The scope of the disclosure is defined by the claims rather than the above description, and intends to include all modifications falling within the claims and equivalents thereof.

What is claimed is:

1. A charging control apparatus for a vehicle, the vehicle including a motor generator and an electric power storage device, the motor generator being configured to be coupled to drive wheels, the electric power storage device being electrically connected to the motor generator,
    the charging control apparatus comprising:
    a communication device configured to receive data from a server that aggregates record data indicative of a travel record of each of the vehicles; and
    a controller configured to execute processing for external charging that is charging of the electric power storage device by electric power supplied from a power supply on the outside of the vehicle,
    the controller being configured to execute the external charging in accordance with a target value of State Of Charge of the electric power storage device, and
    the controller being configured to lower the target value from a first target value to a second target value in a case where the controller predicts that the State Of Charge exceeds the target value by a specified amount or larger in a section, in accordance with the record data that is aggregated in the server, when the vehicle starts traveling after completion of the external charging.

2. The charging control apparatus according to claim 1, wherein
    the controller is configured to increase the target value from the second target value in accordance with an amount of lacking electric power in a case where the controller predicts that the State Of Charge reaches a lower limit value and the electric power becomes insufficient in the section, in accordance with the record data that is aggregated in the server, when the vehicle starts traveling after the completion of the external charging in accordance with the second target value.

3. The charging control apparatus according to claim 2, wherein
    the controller is configured to increase the target value from the second target value in accordance with the amount of the lacking electric power in a section where the amount of the lacking electric power is the largest in a case where the controller predicts that that the State Of Charge reaches the lower limit value and the electric power becomes insufficient in a plurality of sections, in accordance with the record data that is aggregated in the server, when the vehicle starts traveling after the completion of the external charging in accordance with the second target value.

4. A charging control method for a vehicle,
    the vehicle including a motor generator coupled to drive wheels, an electric power storage device electrically connected to the motor generator, and a charging control apparatus, and
    the charging control apparatus including a communication device and a controller, the communication device being configured to receive data from a server that aggregates record data indicative of a travel record of each of the vehicles, and the controller being configured to execute processing for external charging that is charging of the electric power storage device by electric power supplied from a power supply on the outside of the vehicle, the charging control method comprising:

executing, by the controller, the external charging in accordance with a target value of State of Charge of the electric power storage device; and lowering, by the controller, the target value from a first target value to a second target value in a case where the controller predicts that the State Of Charge exceeds the target value by a specified amount or larger in a section in accordance with the record data that is aggregated in the server when the vehicle starts traveling after completion of the external charging.

* * * * *